United States Patent
Utsunomiya

(10) Patent No.: US 9,812,958 B2
(45) Date of Patent: Nov. 7, 2017

(54) VOLTAGE REGULATOR WITH IMPROVED OVERSHOOT AND UNDERSHOOT VOLTAGE COMPENSATION

(71) Applicant: Seiko Instruments Inc., Chiba-shi, Chiba (JP)

(72) Inventor: Fumiyasu Utsunomiya, Chiba (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 0 days.

(21) Appl. No.: 14/196,723

(22) Filed: Mar. 4, 2014

(65) Prior Publication Data
US 2014/0253076 A1    Sep. 11, 2014

(30) Foreign Application Priority Data

Mar. 6, 2013 (JP) .................................. 2013-044169
Jan. 10, 2014 (JP) .................................. 2014-002972

(51) Int. Cl.
| G05F 1/565 | (2006.01) |
| G05F 1/00 | (2006.01) |
| G05F 1/44 | (2006.01) |
| H02M 3/158 | (2006.01) |

(52) U.S. Cl.
CPC ............ *H02M 3/158* (2013.01); *G05F 1/565* (2013.01)

(58) Field of Classification Search
CPC . G05F 1/462; G05F 1/56; G05F 1/565; G05F 1/571; G05F 1/575
USPC ........ 323/312–316, 273, 276–278, 282–284; 327/539–541, 100, 306, 331–332; 363/55, 56.01–56.05
See application file for complete search history.

(56) References Cited

U.S. PATENT DOCUMENTS

| 6,005,378 | A * | 12/1999 | D'Angelo et al. ............ 323/313 |
| 6,188,211 | B1 * | 2/2001 | Rincon-Mora ......... G05F 1/575 323/273 |
| 6,522,111 | B2 * | 2/2003 | Zadeh ...................... G05F 1/575 323/277 |
| 6,819,165 | B2 * | 11/2004 | Ho ........................... G05F 1/575 323/316 |
| 6,933,772 | B1 * | 8/2005 | Banerjee ................ G05F 1/565 323/277 |
| 7,254,723 | B1 * | 8/2007 | Favey ................... G06F 1/3203 713/300 |
| 7,816,897 | B2 * | 10/2010 | Illegems ...................... 323/277 |
| 8,344,713 | B2 * | 1/2013 | Shrivas .................. G05F 1/575 323/273 |

(Continued)

FOREIGN PATENT DOCUMENTS

JP    2005-092693 A    4/2005

Primary Examiner — Jeffrey Gblende
Assistant Examiner — David A Singh
(74) Attorney, Agent, or Firm — Brinks Gilson & Lione

(57) ABSTRACT

A voltage regulator includes an error amplifier; an output transistor; and a first transistor including a gate for inputting a reference voltage and a source for inputting an output voltage. The first transistor is configured to cause a current to flow when the output voltage becomes an irregular voltage, and a current of the output transistor is controlled based on the current flowing through the first transistor. The voltage regulator capable of improving the overshoot or undershoot of the output voltage in a wide temperature range and to reduce a delay in detection of the overshoot or undershoot.

4 Claims, 4 Drawing Sheets

(56) References Cited

U.S. PATENT DOCUMENTS

| | | | | |
|---|---|---|---|---|
| 8,773,096 B2* | 7/2014 | Wang | ............... | G05F 1/575 |
| | | | | 323/274 |
| 2006/0181258 A1* | 8/2006 | Benbrik | ............ | G05F 1/565 |
| | | | | 323/315 |
| 2007/0290665 A1* | 12/2007 | Moraveji | ............ | G05F 1/575 |
| | | | | 323/274 |
| 2009/0195290 A1* | 8/2009 | Moraveji | ............ | G05F 1/575 |
| | | | | 327/331 |
| 2010/0156362 A1* | 6/2010 | Xie | ............ | G05F 1/565 |
| | | | | 323/273 |
| 2010/0156364 A1* | 6/2010 | Cho | ............ | G05F 1/573 |
| | | | | 323/280 |
| 2012/0212200 A1* | 8/2012 | Amer | ............ | G05F 1/575 |
| | | | | 323/282 |
| 2013/0119954 A1* | 5/2013 | Lo | ............ | G05F 1/575 |
| | | | | 323/280 |

* cited by examiner

US 9,812,958 B2

VOLTAGE REGULATOR WITH IMPROVED OVERSHOOT AND UNDERSHOOT VOLTAGE COMPENSATION

RELATED APPLICATIONS

This application claims priority under 35 U.S.C. §119 to Japanese Patent Application Nos. 2013-044169 filed on Mar. 6, 2013 and 2014-002972 filed on Jan. 10, 2014, the entire contents of which are hereby incorporated by reference.

BACKGROUND OF THE INVENTION

1. Field of the Invention

The present invention relates to an improvement in transient characteristics in a voltage regulator.

2. Description of the Related Art

FIG. 5 illustrates a circuit diagram of a related-art voltage regulator. The related-art voltage regulator includes an error amplifier 110, PMOS transistors 120 and 201, an NMOS transistor 202, resistors 211, 212, 213, and 214, capacitors 231 and 232, a power supply terminal 100, a ground terminal 101, a reference voltage terminal 102, and an output terminal 103.

The error amplifier 110 controls a gate of the PMOS transistor 120, and an output voltage Vout is thereby output from the output terminal 103. The output voltage Vout has a value determined by dividing a voltage of the reference voltage terminal 102 by a total resistance value of the resistor 212 and the resistor 213 and multiplying the resultant value by a total resistance value of the resistor 211, the resistor 212, and the resistor 213. In order to reduce an overshoot of the output voltage Vout, the PMOS transistor 201, the NMOS transistor 202, and the resistor 214 are provided.

When an overshoot occurs in the output voltage Vout, the NMOS transistor 202 is turned on to cause a current to flow through the resistor 214. Then, a voltage is generated across the resistor 214 to turn on the PMOS transistor 201. When the PMOS transistor 201 is turned on, the gate of the PMOS transistor 120 is pulled up to a power supply voltage to turn off the PMOS transistor 120. Therefore, an overshoot in the output voltage Vout can be prevented (see, for example, FIG. 5 of Japanese Patent Application Laid-open No. 2005-92693).

In the related-art voltage regulator, however, there is a problem in that the overshoot cannot be prevented in a wide temperature range. Further, there is another problem in that a delay may occur in the detection of the overshoot and hence the overshoot may be large during the delay. In addition, in the case where a load current frequently fluctuates, there is another problem in that a circuit for preventing the overshoot or undershoot frequently operates to increase current consumption.

The related-art voltage regulator circuit with a reduced overshoot voltage is configured to detect the generation of a predetermined overshoot voltage or higher by the fact that a voltage obtained by dividing the output voltage Vout by the resistors has become equal to or higher than a threshold voltage of the NMOS transistor, and to turn off the output transistor so that the predetermined overshoot voltage or higher is not generated. Further, although not illustrated, a related-art voltage regulator circuit with a reduced undershoot voltage is configured to detect the generation of a predetermined undershoot voltage or higher by the fact that the voltage obtained by dividing the output voltage Vout by the resistors has become lower than the threshold voltage of the NMOS transistor, and to completely turn on the output transistor so that the predetermined undershoot voltage or higher is not generated.

A voltage value of the overshoot or undershoot detected by the related-art voltage regulator circuit is a value determined by multiplying the threshold of the NMOS transistor 202 by a voltage division ratio. However, the threshold of the NMOS transistor 202 decreases at high temperature and increases at low temperature. Thus, when design is made in consideration of this temperature-related variation, the overshoot voltage is significantly large at low temperature and the undershoot voltage is significantly large at high temperature. Thus, in the case where the operation is required in a wide temperature range, the overshoot voltage or the undershoot voltage to be detected cannot be decreased. Thus, there is a problem in that the rise in overshoot cannot be prevented depending on the operating temperature range, and the overshoot cannot be prevented in a wide temperature range.

Further, this problem becomes more serious as the output voltage Vout becomes higher because the voltage division ratio is large. In addition, a voltage variation in output voltage Vout is transmitted to a gate of the NMOS transistor via the voltage dividing resistors, and hence a delay occurs to delay the detection of the overshoot or undershoot voltage. Thus, there is a problem in that a delay may occur in the detection of the overshoot and the overshoot may be large during the delay.

In the case where the voltage fluctuation in output voltage Vout is transmitted to the gate of the NMOS transistor via a coupling capacitor in order to eliminate the delay described above, the variation in output voltage Vout is directly transmitted to the gate of the NMOS transistor, and the overshoot voltage or the undershoot voltage is decreased. Thus, when the load current frequently fluctuates, the circuit for preventing the overshoot or undershoot frequently operates to increase the current consumption. Thus, in the case where the load current frequently fluctuates, there is a problem in that the circuit for preventing the overshoot or undershoot frequently operates to increase the current consumption.

SUMMARY OF THE INVENTION

The present invention has been made in view of the above-mentioned problems, and provides a voltage regulator capable of, when an overshoot or undershoot occurs in an output voltage, improving the overshoot or undershoot in a wide temperature range and reducing a delay in detection of the overshoot or undershoot, thereby preventing current consumption from being increased even when a load current frequently fluctuates.

In order to solve the related-art problems, a voltage regulator according to one embodiment of the present invention is configured as follows.

Specifically, the voltage regulator includes: an error amplifier; an output transistor; and a first transistor including a gate for inputting a reference voltage and a source for inputting an output voltage, in which the first transistor is configured to cause a current to flow when the output voltage becomes an irregular voltage, and a current of the output transistor is controlled based on the current flowing through the first transistor.

According to the voltage regulator according to one embodiment of the present invention, the overshoot or undershoot occurring in the output voltage can be improved in a wide temperature range, and a delay time in the detection of the overshoot or undershoot can be reduced, thereby preventing the current consumption from being increased even when the load current frequently fluctuates.

DETAILED DESCRIPTION OF THE PREFERRED EMBODIMENT

Now, an embodiment of the present invention is described below with reference to the accompanying drawings.

Embodiment

Figure 1:
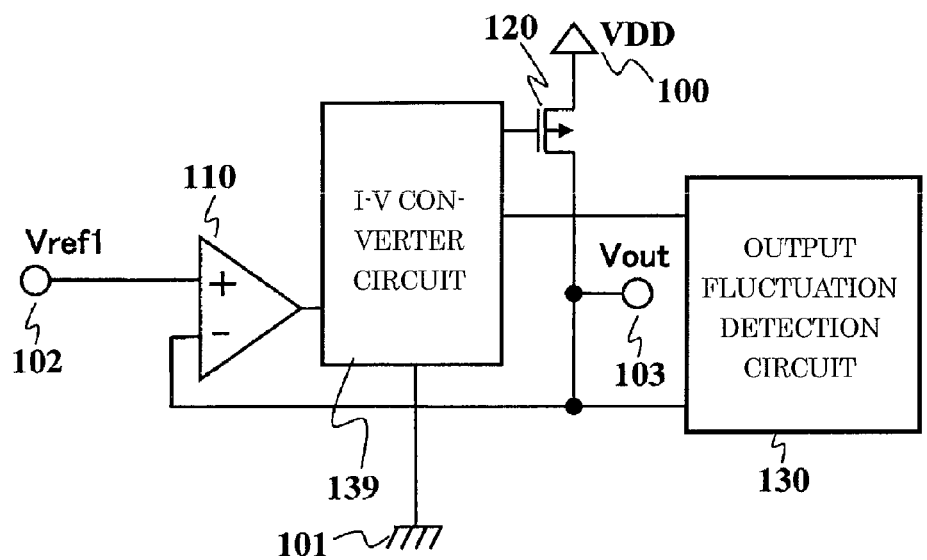
FIG. 1 is a block diagram of a voltage regulator according to an embodiment of the present invention.
Figure 2:
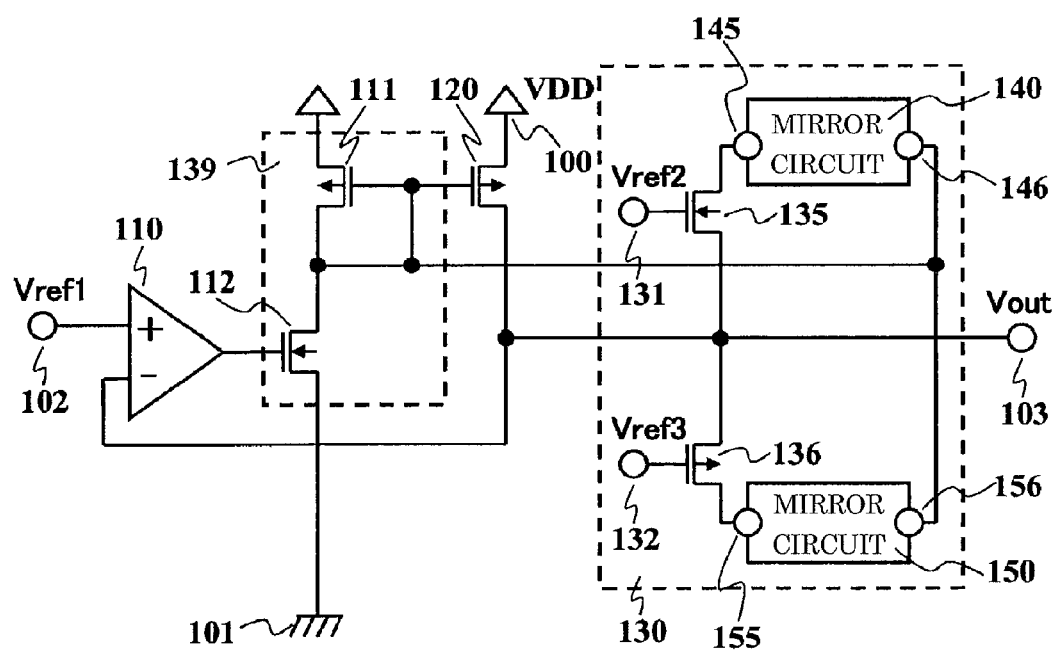
FIG. 2 is a circuit diagram of the voltage regulator according to the embodiment of the present invention.
Figure 3:
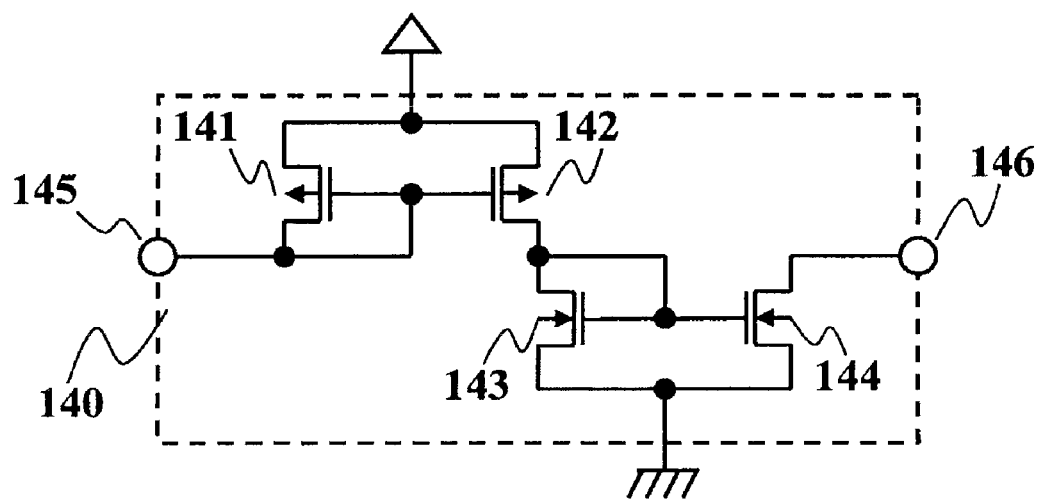
FIG. 3 is a circuit diagram of a mirror circuit of the voltage regulator according to the embodiment of the present invention.
Figure 4:
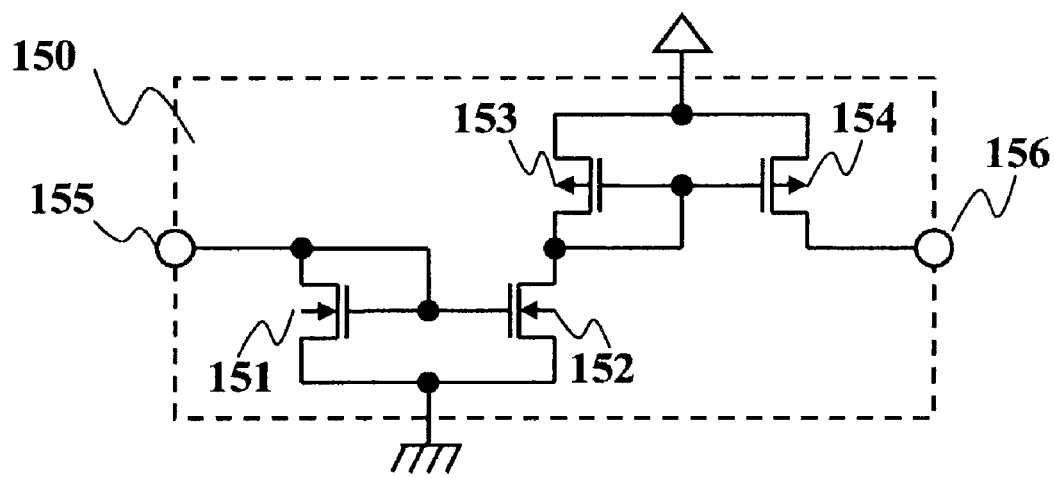
FIG. 4 is a circuit diagram of another mirror circuit of the voltage regulator according to the embodiment of the present invention.
Figure 5:
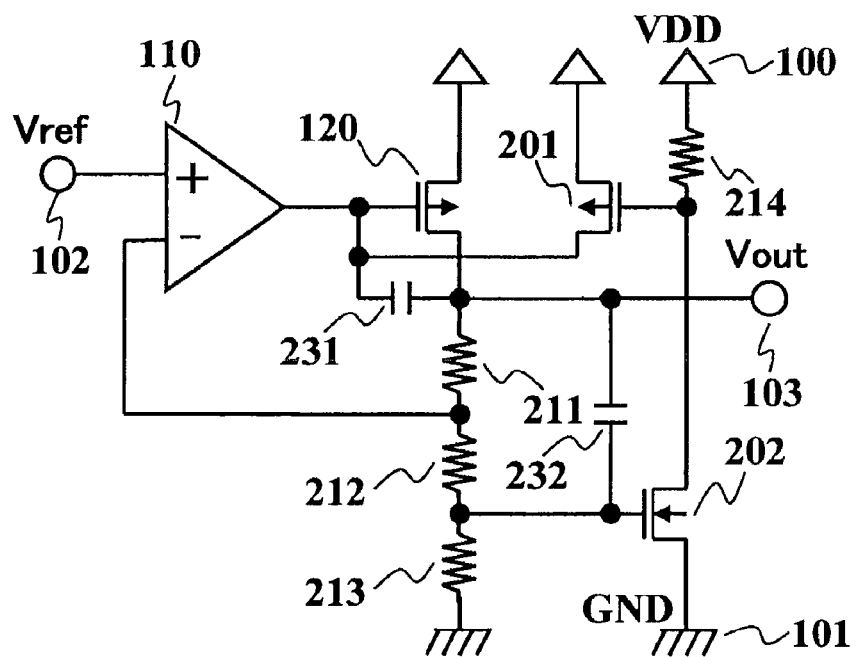
FIG. 5 is a circuit diagram of a related-art voltage regulator.

FIG. 1 is a block diagram of a voltage regulator according to an embodiment of the present invention. The voltage regulator according to this embodiment includes an error amplifier 110, a PMOS transistor 120, an output fluctuation detection circuit 130, an I-V converter circuit 139, a power supply terminal 100, a ground terminal 101, a reference voltage terminal 102, and an output terminal 103. The PMOS transistor 120 operates as an output transistor. FIG. 2 is a circuit diagram of the voltage regulator according to this embodiment. The output fluctuation detection circuit 130 includes a PMOS transistor 136, an NMOS transistor 135, mirror circuits 140 and 150, and reference voltage terminals 131 and 132. The I-V converter circuit 139 includes a PMOS transistor 111 and an NMOS transistor 112. FIG. 3 is a circuit diagram illustrating details of the mirror circuit 140 of the voltage regulator according to this embodiment. The mirror circuit 140 includes PMOS transistors 141 and 142, NMOS transistors 143 and 144, an input terminal 145, and an output terminal 146. FIG. 4 is a circuit diagram illustrating details of the mirror circuit 150 of the voltage regulator according to this embodiment. The mirror circuit 150 includes PMOS transistors 153 and 154, NMOS transistors 151 and 152, an input terminal 155, and an output terminal 156.

Next, connections in the voltage regulator according to this embodiment are described. The error amplifier 110 has a non-inverting input terminal connected to the reference voltage terminal 102, an inverting input terminal connected to the output terminal 103, and an output terminal connected to a gate of the NMOS transistor 112. The NMOS transistor 112 has a drain connected to a gate and a drain of the PMOS transistor 111, and a source connected to the ground terminal 101. The PMOS transistor 111 has a source connected to the power supply terminal 100. The PMOS transistor 120 has a gate connected to the gate of the PMOS transistor 111, a drain connected to the output terminal 103, and a source connected to the power supply terminal 100. The NMOS transistor 135 has a gate connected to the reference voltage terminal 131, a source connected to the output terminal 103, and a drain connected to the input terminal 145 of the mirror circuit 140. The PMOS transistor 136 has a gate connected to the reference voltage terminal 132, a source connected to the output terminal 103, and a drain connected to the input terminal 155 of the mirror circuit 150. The output terminal 146 of the mirror circuit 140 is connected to the drain of the NMOS transistor 112 and the output terminal 156 of the mirror circuit 150. The PMOS transistor 141 has a gate and a drain connected to the input terminal 145 and a gate of the PMOS transistor 142, and a source connected to the power supply terminal 100. The PMOS transistor 142 has a drain connected to a gate and a drain of the NMOS transistor 143, and a source connected to the power supply terminal 100. The NMOS transistor 143 has a source connected to the ground terminal 101. The NMOS transistor 144 has a gate connected to the gate of the NMOS transistor 143, a drain connected to the output terminal 146, and a source connected to the ground terminal 101. The NMOS transistor 151 has a gate and a drain connected to the input terminal 155, and a source connected to the ground terminal 101. The NMOS transistor 152 has a gate connected to the gate of the NMOS transistor 151, a drain connected to a gate and a drain of the PMOS transistor 153, and a source connected to the ground terminal 101. The PMOS transistor 153 has a source connected to the power supply terminal 100. The PMOS transistor 154 has a gate connected to the gate of the PMOS transistor 153, a drain connected to the output terminal 156, and a source connected to the power supply terminal 100.

An operation of the voltage regulator according to this embodiment is now described. The reference voltage terminal 102 is connected to a reference voltage circuit to input a reference voltage Vref1. The reference voltage terminal 131 is connected to a reference voltage circuit to input a reference voltage Vref2. The reference voltage terminal 132 is connected to a reference voltage circuit to input a reference voltage Vref3.

The error amplifier 110 controls a gate voltage of the NMOS transistor 112 so that the output voltage Vout may be the reference voltage Vref1. When the output voltage Vout is higher than a target value, the output voltage Vout becomes higher than the reference voltage Vref1, and an output signal of the error amplifier 110 (gate voltage of the NMOS transistor 112) decreases. Then, a current flowing through the NMOS transistor 112 is decreased. The PMOS transistor 111 and the PMOS transistor 120 construct a current mirror circuit. When the current flowing through the NMOS transistor 112 decreases, the current flowing through the PMOS transistor 120 also decreases. Because the output voltage Vout is set by the current flowing through the PMOS transistor 120 and a load current and an output current of the PMOS transistor 120, when the current flowing through the PMOS transistor 120 decreases, the output voltage Vout decreases.

When the output voltage Vout is lower than a target value, the output voltage Vout becomes lower than the reference voltage Vref1, and the output signal of the error amplifier 110 (gate voltage of the NMOS transistor 112) increases. Then, the current flowing through the NMOS transistor 112 is increased, and the current flowing through the PMOS transistor 120 is also increased. Because the output voltage Vout is set by the current flowing through the PMOS transistor 120 and the load current and the output current of the PMOS transistor 120, when the current flowing through the PMOS transistor 120 increases, the output voltage Vout increases. In this manner, the output voltage Vout is controlled to be constant.

Through the operation described above, the I-V converter circuit 139 controls the current flowing through the output transistor 120 based on the current controlled by the output of the error amplifier 110.

The case is considered where an overshoot appears in the output terminal 103 and the output voltage Vout increases transiently. The reference voltage Vref1, the reference voltage Vref2, and the reference voltage Vref3 are set to satisfy the relationship of Vref3≤Vref1≤Vref2. A threshold of the PMOS transistor 136 is represented by Vtp. When the output voltage Vout increases transiently to satisfy Vout≥|Vtp|+Vref3, the PMOS transistor 136 is turned on to cause a current to flow to the NMOS transistor 151. The NMOS transistor 151 and the NMOS transistor 152 construct a current mirror circuit, and the PMOS transistor 153 and the PMOS transistor 154 construct a current mirror circuit. When the current flows through the NMOS transistor 151, the current is mirrored to flow through the PMOS transistor 154.

The voltage regulator operates so that the current from the PMOS transistor 154 may flow to the NMOS transistor 112, but because the output of the error amplifier 110 is not changed, the amount of the current that can be caused to flow to the NMOS transistor 112 is not changed, and the current from the PMOS transistor 154 cannot be caused to flow. Thus, the PMOS transistor 111 operates so as to decrease the current flowing from the PMOS transistor 111 to the NMOS transistor 112, thereby causing the current from the PMOS transistor 154 to flow to the NMOS transistor 112. Because the current flowing through the PMOS transistor 111 decreases, the current flowing through the PMOS transistor 120 also decreases. In this manner, the output voltage Vout is controlled not to increase any more, thereby stopping the increase in overshoot of the output voltage Vout.

After the overshoot occurs, when the output voltage Vout is controlled to decrease, the current flowing through the PMOS transistor 136 also gradually decreases, and the current of the NMOS transistor 151 also gradually decreases. Then, the current of the PMOS transistor 154 also gradually decreases, the current of the PMOS transistor 111 gradually increases to return to a normal current value, and the output voltage Vout is controlled to be constant. During this control, the PMOS transistor 120 is not turned off but operates to continue controlling the output voltage Vout. Consequently, the output voltage Vout can be controlled stably without being decreased due to an insufficient output current even immediately after the overshoot is eliminated.

The case is considered where an undershoot appears in the output terminal 103 and the output voltage Vout decreases transiently. A threshold of the NMOS transistor 135 is represented by Vtn. When the output voltage Vout decreases transiently to satisfy Vout≤Vref2−Vtn, the NMOS transistor 135 is turned on to cause a current to flow to the PMOS transistor 141. The PMOS transistor 141 and the PMOS transistor 142 construct a current mirror circuit, and the NMOS transistor 143 and the NMOS transistor 144 construct a current mirror circuit. When the current flows through the PMOS transistor 141, the current is mirrored to flow through the NMOS transistor 144.

The PMOS transistor 111 causes a current to flow to the NMOS transistor 112. When the undershoot appears in the output terminal 103, because the output of the error amplifier 110 is not changed, if the NMOS transistor 144 causes a current to flow, the PMOS transistor 111 needs to cause a current to flow also to the NMOS transistor 144, which increases the current flowing through the PMOS transistor 111. Then, because the current flowing through the PMOS transistor 111 increases, the current flowing to the PMOS transistor 120 also increases. In this manner, the output voltage Vout is controlled not to decrease any more, thereby stopping the decrease in undershoot of the output voltage Vout.

After the undershoot occurs, when the output voltage Vout is controlled to increase, the current flowing through the NMOS transistor 135 gradually decreases, and the current of the PMOS transistor 141 also gradually decreases. Then, the current of the NMOS transistor 144 also gradually decreases, and the current of the PMOS transistor 111 gradually decreases to return to a normal current value. Then, the output voltage Vout is controlled to be constant. During this control, the PMOS transistor 120 is not turned off but operates to continue controlling the output voltage Vout. Consequently, the output voltage Vout can be controlled stably without being increased due to an excessive output current even immediately after the undershoot is eliminated.

The overshoot or undershoot occurring in the output voltage can be detected directly by the output fluctuation detection circuit 130 not via voltage dividing resistors unlike the related art. Consequently, the temperature-related variation in threshold of the transistor is not multiplied by a voltage division ratio by the voltage dividing resistors, and hence the overshoot or undershoot can be prevented from being increased at high temperature or low temperature, thereby improving the overshoot and undershoot in a wide temperature range. Further, a delay caused by the voltage dividing resistors is not generated, and hence the generation of a delay in the detection of the overshoot or undershoot can be prevented to prevent the overshoot or undershoot from being increased.

The overshoot or undershoot occurring in the output voltage is detected not via a coupling capacitor unlike the related art. Consequently, even when the overshoot or undershoot frequently occurs, the output fluctuation detection circuit 130 does not respond thereto frequently, and hence the current consumption can be prevented from being constantly increased.

Note that, the mirror circuits have been described with reference to FIGS. 3 and 4, but the configurations are not limited thereto. Any configuration can be used as long as the current can be mirrored.

Figure 6:
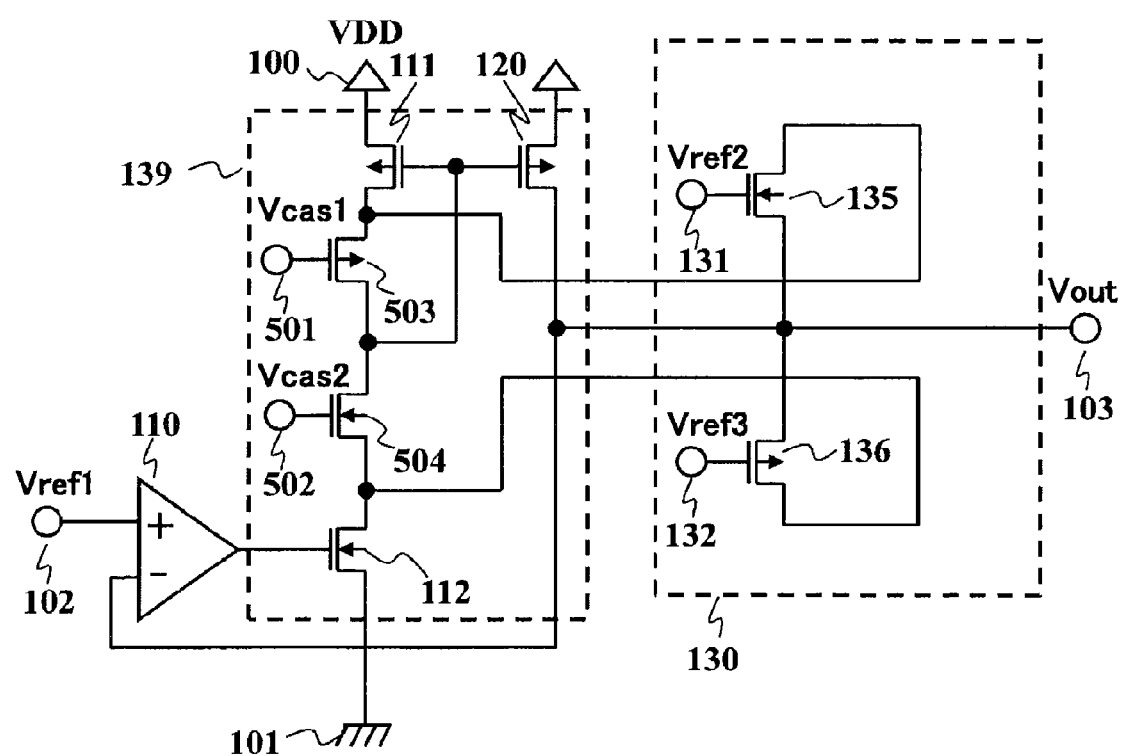
FIG. 6 is a circuit diagram illustrating another example of the voltage regulator according to the embodiment of the present invention.

FIG. 6 is a circuit diagram illustrating another example of the voltage regulator according to this embodiment. The output fluctuation detection circuit 130 and the I-V converter circuit 139 have different configurations from those of the circuits of FIG. 2. Specifically, the mirror circuits 140 and 150 are deleted from the output fluctuation detection circuit 130, and a PMOS transistor 503 and an NMOS transistor 504 as cascode transistors are added to the I-V converter circuit 139.

The PMOS transistor 503 has a source connected to the drain of the PMOS transistor 111 and the drain of the NMOS transistor 135, a drain connected to the gates of the PMOS transistor 111 and the PMOS transistor 120 and a drain of the NMOS transistor 504, and a gate connected to a first cascode voltage input terminal 501 for inputting a first cascode voltage Vcas1. The NMOS transistor 504 has a source connected to the drain of the PMOS transistor 136 and the drain of the NMOS transistor 112, and a gate connected to a second cascode voltage input terminal 502 for inputting a second cascode voltage Vcas2.

Similarly to the circuits of FIG. 2, the voltage regulator of FIG. 6 operates so that the current of the PMOS transistor 120 may increase in accordance with the current flowing through the NMOS transistor 135, and the current of the PMOS transistor 120 may decrease in accordance with the current flowing through the PMOS transistor 136.

The PMOS transistor 503 is provided in order to increase a drain voltage of the PMOS transistor 111 so that the PMOS transistor 111 may operate in the saturation region, and the first cascode voltage Vcas1 is appropriately set. In other words, when an undershoot occurs in the output terminal 103, if the drain voltage of the PMOS transistor 111 is sufficiently high, the current of the PMOS transistor 120 can be increased with the current flowing through the NMOS transistor 135.

The NMOS transistor 504 is provided in order to decrease a drain voltage of the NMOS transistor 112 so that the NMOS transistor 112 may operate in the saturation region, and the second cascode voltage Vcas2 is also appropriately set. In other words, when an overshoot occurs in the output terminal 103, if the drain voltage of the NMOS transistor 112 is sufficiently low, the current of the PMOS transistor 120 can be decreased with the current flowing through the PMOS transistor 136.

As described above, the voltage regulator of FIG. 6 is capable of detecting the overshoot and undershoot occurring in the output voltage Vout directly by the output fluctuation detection circuit 130 not via voltage dividing resistors unlike the related art. Consequently, the temperature-related variation in threshold of the transistor is not multiplied by a voltage division ratio by the voltage dividing resistors, and hence the overshoot or undershoot can be prevented from being increased at high temperature or low temperature, thereby improving the overshoot and undershoot in a wide temperature range. Further, a delay caused by the voltage dividing resistors is not generated, and hence the generation of a delay in the detection of the overshoot or undershoot can be prevented to prevent the overshoot or undershoot from being increased.

In addition, the current flowing through the NMOS transistor 135 or the PMOS transistor 136 can be transmitted to the PMOS transistor 120 not via a mirror circuit, and hence this current can be transmitted more quickly. Consequently, as compared to the circuit configuration of FIG. 2, the undershoot or overshoot can be suppressed quickly, and hence the voltage amount of the undershoot or overshoot can be reduced.

Further, the circuit configuration of FIG. 6 has another effect that the voltage regulator can be downsized because the mirror circuits 140 and 150 are not necessary.

As described above, the voltage regulator according to this embodiment is capable of improving the overshoot or undershoot occurring in the output voltage Vout in a wide temperature range, and reducing the delay time in the detection of the overshoot or undershoot, thereby preventing the current consumption from being increased even when the load current frequently fluctuates.

What is claimed is:

1. A voltage regulator, comprising:
   an error amplifier having an error output node having a voltage proportional to a difference between an inverting input and a non-inverting input of the error amplifier that is coupled to a first voltage reference;
   an I-V converter circuit that comprises a first transistor having a gate coupled to the error output node of the error amplifier, and a second transistor having a gate and drain coupled to a drain of the first transistor and a drive output node;
   an output transistor having a gate terminal coupled to the drive output node of the I-V converter circuit and an output terminal configured to output a voltage of the voltage regulator for driving a load, wherein the error output node and the drive output node are different; and
   a third transistor that includes a gate configured to receive a second reference voltage from a reference voltage generator circuit that is separate from the I-V converter circuit, a source coupled to the output terminal, and a drain that is connected to an internal node of the I-V converter circuit,
   wherein when the output voltage deviates from the second reference voltage by more than a predetermined threshold, current flows directly between the third transistor and the internal node of the I-V converter circuit to thereby control a current of the output transistor,
   wherein the value of the second reference voltage received at the gate of the third transistor is set to be less than, equal to, or greater than the first voltage reference.

2. A voltage regulator according to claim 1, wherein the I-V converter circuit is configured to control the current flowing through the output transistor based on a current controlled by the voltage present on the error output node of the error amplifier and the current flowing through the third transistor.

3. The voltage regulator according to claim 2, wherein the I-V converter circuit comprises a cascode transistor provided between the first transistor and the second transistor.

4. The voltage regulator according to claim 1, wherein the I-V converter circuit comprises a cascode transistor provided between the first transistor and the second transistor.

* * * * *